June 8, 1965     S. R. SPORN     3,188,625
ANALOG TO DIGITAL CONVERSION TRANSDUCER
Filed Dec. 1, 1960
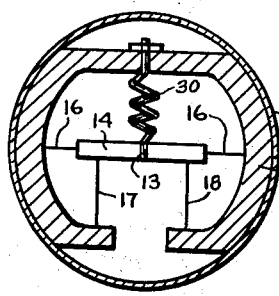
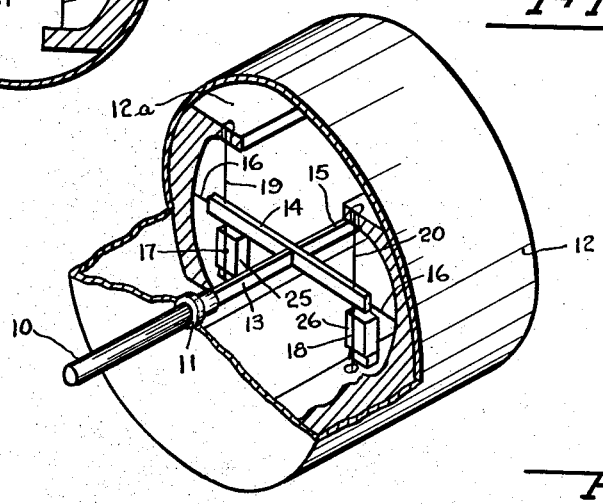
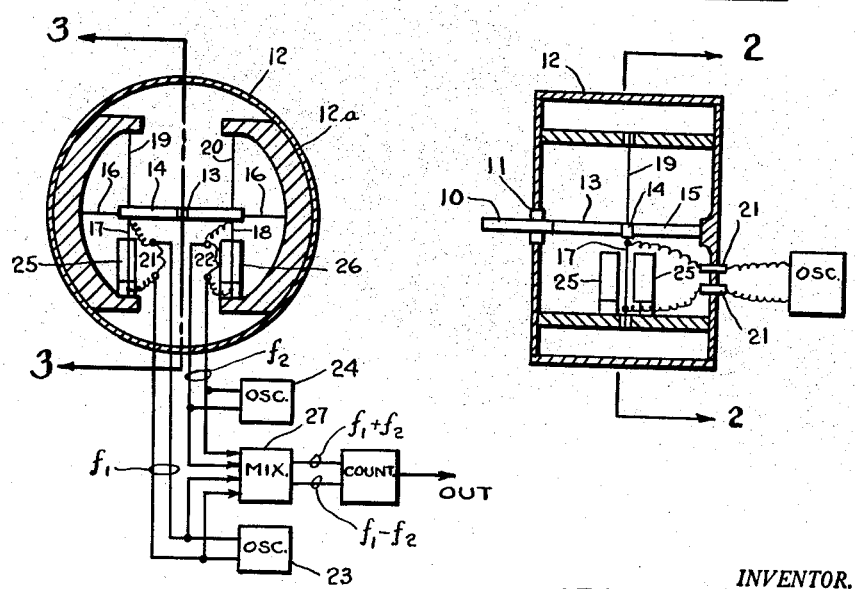
INVENTOR.
STANLEY R. SPORN
BY *Raymond A. Paquin*
ATTORNEY.

United States Patent Office 3,188,625
Patented June 8, 1965

3,188,625
ANALOG TO DIGITAL CONVERSION TRANSDUCER
Stanley R. Sporn, Oceanside, N.Y., assignor to American Bosch Arma Corporation, a corporation of New York
Filed Dec. 1, 1960, Ser. No. 73,017
5 Claims. (Cl. 340—347)

The present invention relates to analog to digital converters and has particular reference to means for converting a shaft displacement to a signal having a corresponding frequency.

The present invention relies on the torsional spring constant of a quartz fiber or tape to apply a known or calibrated torque (upon angular displacement of its ends) to a bar whose angular position is initially balanced by the tension in two sensitive tapes or wires. The resulting torque application creates opposite tension changes which are sensed by monitoring the natural frequencies of vibration of the two tapes and is measured by observing the difference of these two natural frequencies. The difference frequency signal represents the angular windup of the quartz tape and a counter operated by the difference frequency delivers a series of pulses whose number per unit time is the digital representation of the analog angular displacement. The total number of pulses accumulated over an extended time interval is a measure of the time integral of the angular displacement in digital form. Thus, in addition to being an analog to digital converter, the device is also an integrater depending upon the external connections.

In accordance with a preferred embodiment of the device, a stiff bar is suspended in a casing by two pairs of parallel tapes or wires, one pair at each end thereof, and a third pair to prevent longitudinal displacement of the bar. A shaft which is displaced angularly by the analog input is connected to one end of a quartz fiber or tape, the other end of which is connected to the center of the stiff bar. Rotation of the shaft causes the quartz tape to apply a calibrated torque to the bar and thereby to change the tension in the suspension wires.

The change in tension is detected by monitoring the natural frequency of vibration of at least two wires, and the difference in the vibration frequencies of the two wires is indicative of the angular displacement of the input shaft. A count of the cycles of frequency difference per unit time is obtained and is a measure of the displacement, in digital units. If proportionality is of prime importance, means are provided to linearize the relationship between the angular displacement of shaft 10 and the frequency difference.

For a more complete understanding, reference may be had to the accompanying diagrams in which FIGURE 1 is a pictorial view of the transducer of the invention partly broken away to reveal the interior.

FIGURE 2 is a cross sectional view of the transducer with the cutting plane passing through line 2—2 of FIGURE 3.

FIGURE 3 is a cross sectional view of the transducer in which the cutting plane is shown by line 3—3 of FIGURE 2.

FIGURE 4 is a cross-sectional view of an alternative form of the invention.

With reference now to the FIGURES 1, 2 and 3 the input shaft 10 is journalled in a thrust bearing 11 supported on one end of a case 12. A quartz fiber or tape 13 is attached at one end to the inner end of shaft 10 and at the other end to a cross bar 14. An end tape 15, preferably of quartz, but not necessarily so, is attached between the cross bar 14 and the opposite end of case 12 to prevent motion of the bar 14 longitudinally of the quartz tape 13. Sidewise motion of the bar 14 is prevented by a pair of axially aligned end tapes or wires 16 which are attached between bar 14 and casing 12, or the framework 12a therein.

The sensitive tapes or wires 17, 18 attached between the extremities of the bar 14 and casing 12, or the framework 12a are in parallel relationship and their points of attachment on bar 14 are equally displaced from the center of bar 14 and from the tape 13. Axially disposed with respect to each of the wires 17, 18 and attached between bar 14 and casing 12 are a second pair of tapes or wires 19, 20 respectively which may be either support tapes or may be used as additional sensitive tapes as will be described. The details relating to the clamping of the wires or attaching the tapes to the bar 14 or the frame 12a are not described since they involve only mechanical design.

The ends of tapes or wires 17, 18, are electrically connected to terminals 21, 22 on the casing 12 by means of which the tapes 17, 18 are connected into the circuits of the electronic oscillators 23, 24 respectively. In accordance with well known phenomena if the tapes 17 and 18 are piezoelectric, they will be vibrated at their natural frequency which is determined by the physical characteristics of the tapes and by the tension applied thereto. If the tapes are metallic rather than piezoelectric, magnets 25, 26 are required to provide a transverse magnetic field in which the tapes are caused to vibrate by the application of the oscillator output to the tapes. In either event the tapes 17, 18 are maintained in vibration at their natural frequency which is a function of the tension applied to the tapes according to the following approximate relationship.

$$f = \sqrt{KT}$$

where:

$f$ is the resonant frequency
$K$ is a constant, and
$T$ is the tension in the tape Angular displacement of shaft 10 is converted to a calibrated torque by the rotational spring constant of the quartz tape 13. This torque creates a change in the tension of the sensitive tapes 17, 18 causing an increase in one tape and a decrease in the other tape, depending on the direction of rotation of shaft 10.

The vibration frequency of the tapes 17 and 18 then changes accordingly so that the frequency of each tape 17, 18 or the difference frequency can be used to indicate rotation of shaft 10. Preferably the difference frequency is used for this purpose since it eliminates the necessity for a standard oscillator of high precision and allows easier linearization of the output.

With reference to FIGURE 2, it will be seen that the electronic oscillators 23, 24 are connected to an electronic mixer circuit 27 from which the difference and sum frequencies $(f_1-f_2)$ and $(f_1+f_2)$ are obtained where $f_1$ is the frequency of vibration of tape 17 and $f_2$ is the frequency of vibration of tape 18. The sum and difference outputs of the mixer 27 are in the form of constant magnitude, variable frequency signals. The frequency of the difference signal $f_1-f_2$, or the number of cycles of frequency difference observed during a preselected time interval represents the angular displacement of the shaft 10, while an accumulation of these cycles of frequency difference obtained during a certain time span including a quantity of these time intervals represents the time integral of the displacement of shaft 10 over that time span.

Although the relationship between difference frequency and shaft displacement is non-linear, compensation by calibration or by linearization can be employed to give a digital indication of the true angle. Thus, if the tension in tape 17 is $T_0+\Delta T$ and the tension in tape 18 is $T_0-\Delta T$ then, $$f_1-f_2=\sqrt{K(T_0+\Delta T)}-\sqrt{K(T_0-\Delta T)}$$

and $$f_1+f_2=\sqrt{K(T_0+\Delta T)}+\sqrt{K(T_0-\Delta T)}$$

whence $$(f_1-f_2)(f_1+f_2)=2K\Delta T \quad (1)$$

Also it can be shown that the tension change $\Delta T$ is proportional to the angular displacement, $\theta$, of shaft 10 according to the equation $$\Delta T = K^1\theta \quad (2)$$

Combining Equations 1 and 2, and rearranging terms, $$(f_1-f_2)(f_1+f_2)=2KK^1\theta \quad (3)$$

and $$(f_1-f_2)\left[\frac{(f_1+f_2)}{2KK^1}\right]=\theta$$

Thus a difference of $f_1-f_2$ cycles per second, corrected according to the factor $[(f_1+f_2)/2KK^1]$ for linearity, repesents a certain angular displacement of shaft 10 and this corrected difference frequency can be employed as the input to a digital device which requires the information. The small frequency differences and changes in frequency difference which define the sensitivity of the transducer may be detected and measured more conveniently by phase comparison than by actually counting the difference in cycles. Either method may be used within the concept of the invention.

A count of the difference cycles accumulated over a given period of time (with proper linearity correction) will be proportional to the time integral of the angular displacement of shaft 10.

This result may be simply shown on an electronic counter which is actuated once each cycle of the difference frequency, or it may be applied to a digital computer as a series of pulses representing the desired integral.

In the embodiment described, the tapes 17 and 18 are the sensitive wires while wires 19 and 20 are merely supporting wires ot provide force balancing of bar 14 to relieve the end tapes 13 and 15 from this duty. It will be seen that other pairs of wires which are oppositely affected by a torsional force on bar 14 can be used equally as well, such as 17 and 19 or 18 and 20 for example with appropriate constructional changes.

In another embodiment, FIG. 4, the supporting tapes 19, 20 of FIG. 1 are replaced by a central spring 30 to reduce the sensitivity of the transducer to temperature changes or other effects causing dimensional instability.

I claim:

1. Analog-to-digital conversion means comprising: a casing; a shaft rotatable in said casing; a lever bar supported on said casing for rotation about a pivot axis therein; a pair of elongated tensioned members connected respectively between said casing and points on said bar on opposite sides of said axis so as to be susceptible of transverse vibration at their natural frequencies and to be differentially tensioned by rotation of said bar about said axis; and a torsionally-resilient member connected between said shaft and said bar for applying a torque to said bar about said axis in response to rotation of said shaft, whereby rotation of said shaft through a given angle produces a predetermined change in said differential tension and in said natural frequencies.

2. The apparatus of claim 1, comprising means for maintaining said tensioned members in vibration at their natural frequencies, and means responsive to said vibration to produce a signal representative of the difference between said frequencies.

3. Apparatus in accordance with claim 1, in which said torsionally-resilient member is of quartz.

4. Apparatus in accordance with claim 1, in which said tensioned members comprise a pair of parallel filaments each connected at one end to said bar and at the other end to said casing.

5. Apparatus in accordance with claim 1, comprising elastic support means for supporting said bar from said casing.

References Cited by the Examiner

UNITED STATES PATENTS

| 2,240,452 | 4/41 | Wolfskill | 331—40 |
| 2,461,645 | 2/49 | Kallmann | 310—8.6 |
| 2,716,893 | 9/55 | Birdsall | 310—8.6 |
| 2,994,075 | 7/61 | Abbott | 340—347 |

MALCOLM A. MORRISON, *Primary Examiner.*

IRVING L. SRAGOW, *Examiner.*